Patented Nov. 29, 1927.

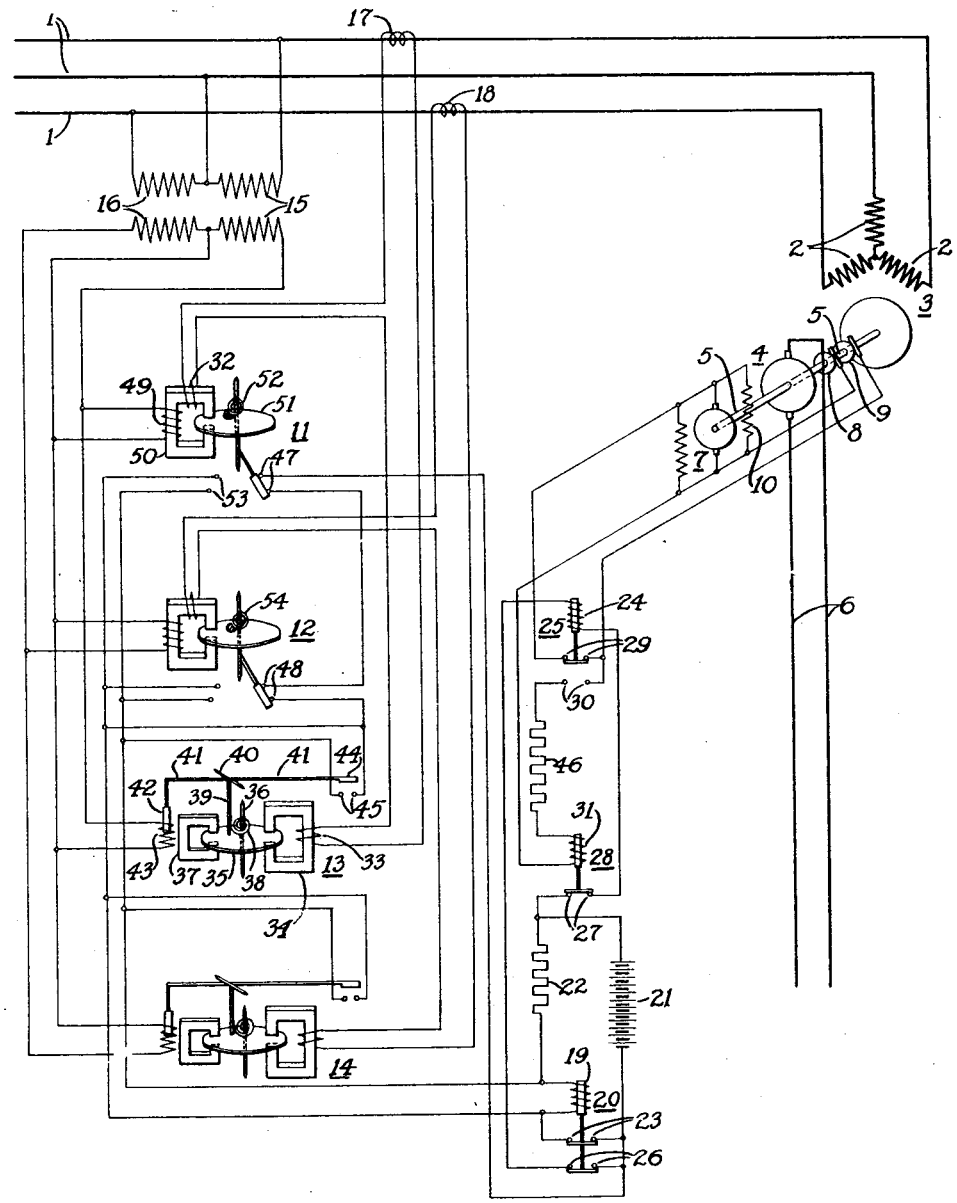

1,650,932

UNITED STATES PATENT OFFICE.

CHARLES A. BUTCHER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

RELAY SYSTEM.

Application filed December 21, 1923. Serial No. 682,080.

My invention relates to relay systems and particularly to such systems as are adapted to control the operation of synchronous motor-generator sets.

One object of my invention is to provide means whereby operation of a motor-generator set is continued when the synchronous motor drops out of synchronism with the circuit that supplies energy to it.

Another object of my invention is to provide means in a motor-generator set for short-circuiting the field-magnet windings of the motor when it falls out of synchronism with the supply circuit, or when any phase of the supply circuit is interrupted.

Another object of my invention is to provide means for maintaining the field-magnet windings of the motor in a short-circuited condition until all the phases of the supply circuit are again in condition to furnish energy to the motor.

A further object of my invention is to provide means whereby the motor may be automatically synchronized with the supply circuit after such an interruption of service.

A still further object of my invention is to provide a system, of the above-indicated character, that shall be simple, relatively inexpensive and reliable in its operation.

The preferred form of my invention comprises an alternating-current supply circuit, a direct-current distribution circuit, and an electrical translating device connected therebetween. This device may comprise a direct-current generator driven by a synchronous motor, as shown in the drawings forming a part of this specification, or it may comprise any other well known means for converting alternating-current energy to direct-current energy. My invention further comprises a system of relays and switches for controlling the operation of the translating device.

The single figure of the accompanying drawing is a diagrammatic representation of an electrical system in which my invention is embodied.

An alternating-current supply circuit 1 supplies energy to the stator windings 2 of a synchronous motor 3. The motor 3 is directly connected to a direct-current generator 4 through a shaft 5. The generator 4 supplies energy to a direct-current distribution circuit 6.

An exciter generator 7 is also mounted on the shaft 5 and is adapted to supply energy to the field-magnet windings of the motor 3 and the generator 4. The field-magnet windings of the motor 3 are of the rotating type and are connected between the slip rings 8 and 9. A field-magnet winding 10 of the direct-current generator 4 is connected directly across the terminals of the exciter generator 7.

The relays 11, 12, 13 and 14, comprising the system in which my invention is embodied, form two complete sets that are connected to two phases of the three-phase supply circuit 1. The reason for showing only the two sets of relays for protecting the three-phase circuit is the well-known fact that any polyphase circuit may be controlled by one set of relays less than the number of phases of the circuit. It will be readily understood that the operation of any set of relays performs exactly the same functions as the same operation of any other set. Therefore, the operation of only one set will be described in this specification, namely, the set comprising the relays 11 and 13.

The relays 11 and 12 may be any well known type of reverse-energy relays, while the relays 13 and 14 are of the type shown in the co-pending application of L. N. Crichton, Serial No. 641,701, filed May 26, 1923, and assigned to the Westinghouse Electric & Manufacturing Company.

Energy is supplied to the relay system from the supply circuit 1 through the potential transformers 15 and 16 and the current transformers 17 and 18. The potential transformer 15 and the current transformer 17 are connected to supply energy to the relays 11 and 13, the operations of which are to be described.

In the accompanying drawings, the various relays and switches are shown in the positions corresponding to the normal operation of the motor 3 and generator 4. When the system is in this condition, the operating coil 19 of a relay 20 is energized from a storage battery 21 through a resistor 22 and contact members 23 of the relay 20. The operating coil 24 of a relay 25 is likewise energized from the storage battery 21 through the contact members 26 of the relay 20 and contact members 27 of a relay 28 that is only responsive to alternating current.

The field-magnet windings of the motor 3, are energized by current traversing the circuit extending from the exciter generator 7 to the slip rings 8 and 9 through the contact members 29 of the relay 25. With the operating coil 24 of the relay 25 in its energized condition, stationary contact members 30 of this relay are disengaged to preclude energization of the operating coil 31 of the relay 28, thereby permitting the relay 28 to maintain engagement of the contact members 27.

It may be assumed now that, for some reason, the motor 3 is about to fall out of synchronism with the supply circuit 1. This might be caused by an excessive overload on the generator 4 or by other abnormal conditions. It is a well-known fact that when a synchronous motor falls out of synchronism with its supply circuit, there is a heavy surge of current in this circuit, ordinarily accompanied by an abnormal reduction of voltage between the terminals of the motor by reason of the line drop.

The current traversing the supply circuit 1 induces an electromotive force in the current transformers 17 and 18. The electromotive force induced in the transformer 17 causes current to traverse the circuit extending through the current coils 32 and 33 of the relays 11 and 13, respectively. The current traversing the current coil 33 of the relay 13 establishes an alternating magnetic flux in the core member 34 that has an opening therein through which a disc 35 is adapted to turn.

The disc 35 is mounted on a vertical spindle 36 that is pivoted at both ends to permit the spindle and disc to turn about the axis of the spindle. This turning is restrained by a damping magnet 37 which is constructed similarly to the core member 34. One end of a spiral spring 38 is attached to the spindle 36 and the other end to a lever 39. The other end of this lever is attached to a horizontally pivoted spindle 40 and a lever 41. A core member 42 of an electromagnet coil 43 is attached to one end of the lever 41 and a bridging member 44 is attached to the other end. The coil 43 is so connected across the secondary terminals of the potential transformer 15 that the flux set up within this coil exerts a force on the core member 42 that is proportional to the voltage between the secondary terminals of the transformer 15, which, in turn, is proportional to the voltage across the primary terminals of this transformer that are connected to one phase of the distribution circuit 1.

The bridging member 44 is adapted to effect engagement of a pair of contact members 45 when the lever 41 is properly deflected. The flux set up in the core member 34 by current traversing the current coil 33 extends through the disc 35 and tends to cause this disc to rotate as an induction motor. A force is thereby transmitted from the spindle 36 to the lower end of the lever 39 through the spiral spring 38, tending to turn the spindle 40 about the horizontal axis between its pivots in such manner as to cause the lever 41 to be so deflected as to engage the contact members 45. The current traversing the coil 43, however, establishes a magnetic flux that so acts upon the core member 42 as to restrain such deflection of the lever 41.

When the abnormal conditions, previously described, corresponding to falling out of synchronism of the motor 3, exist in the supply circuit 1, the torque exerted on the disc 35 by the flux set up by the current traversing the coil 33 is abnormally large because of the abnormal current traversing the supply circuit 1, and hence the current transformer 17. The flux set up by the current traversing the coil 43 is abnormally low because of the reduction of voltage between the conductors of the supply circuit 1 and hence between both the primary and secondary terminals of the potential transformer 15.

Thus, a relatively large force is tending to deflect the lever 41 in such a manner as to cause the bridging member 44 to engage the contact members 45, while a relatively small force is exerted on the core member 42 tending to restrain this operation. If the simultaneous abnormality of current and potential conditions in the supply circuit 1 are of sufficient proportions to indicate that the motor 3 has fallen out of synchronism, the overbalancing of the forces acting upon the lever 41 will be sufficient to cause the bridging member 44 to engage the contact members 45.

In the event that the voltage between the terminals of the motor 3 is maintained at substantially its normal value, in spite of the fact that the motor is about to fall out of synchronism, the magnetic lines of force set up by the coil 43 are unchanged, and the force exerted thereby on the armature member 42 is likewise unchanged. Therefore, a heavier current must traverse the coil 33 than before to cause the bridging member 44 to engage the contact members 45. This is the desired condition, however, for at normal voltage, the pull-out current of the motor 3 is greater than at reduced voltage. Thus, it will be seen that the relay 13 operates to cause the bridging member 44 to engage the contact members 45 whenever the motor 3 falls out of synchronism with the line 1, regardless of the value of voltage between the terminals of the motor.

Engagement of the contact members 45 short-circuits the operating coil 19 of the relay 20 to thereby effect disengagement of the contact members 23 and 26, respectively. When the contact members 26 are thus disengaged, the circuit extending from the battery 21 to the operating coil 24 of the relay 25 is interrupted to effect de-energization of the coil 24. The relay 25 then effects disengagement of the contact members 29 and engagement of the contact members 30.

When the contact members 29 are disengaged, the circuit extending from the exciter generator 7 to the field-magnet windings of the motor 3 through the slip rings 8 and 9, is interrupted to de-energize these windings. Engagement of the contact members 30 completes a circuit that comprises the operating coil 31 of the relay 28 and a resistor 46 and shunts the field-magnet windings of the motor 3.

Energization of the field-magnet windings of the motor 3 from the exciter generator 7 is now precluded and the only current traversing these windings is that which is set up by the alternating electromotive force induced in the windings by the transformer action between them, and the alternating current stator windings 2. The alternating current that is set up by this induced electromotive force traversing the resistor 46 and the operating coil 31 of the relay 28, causes the relay 28 to effect disengagement of the contact members 27. Re-energization of the operating coil 24 of the relay 25 is thereby precluded until the coil 31 is de-energized to permit re-engagement of the contact members 27.

When the field-magnet windings of the motor 3 are de-energized and close-circuited through the resistor 46 and the coil 31, the motor develops a very heavy torque tending to return it to synchronism with the supply circuit 1. When the motor does return to synchronism with the circuit 1, the current traversing this circuit falls back to more nearly its normal value and the voltage of this circuit rises to substantially its normal value. The forces exerted on the lever 41 of the relay 13 are then restored to substantially their normal values to cause this relay to effect disengagement of the contact members 45.

The circuit shunting the operating coil 19 of the relay 20 is thereby interrupted and this coil is re-energized by current traversing the circuit extending from the battery 21 through contact members 47 and 48 of the relays 11 and 12, respectively, the coil 19 and the resistor 22 back to the battery 21. When the coil 19 is thus energized, the relay 20 effects engagement of the contact members 23 and 26, respectively. Engagement of the contact members 23 completes a circuit shunting the contact members 47 and 48, respectively, to thereby maintain energization of the coil 19 until a circuit shunting this coil is again completed.

When the motor 3 returns to synchronism with the supply circuit 1, there is no longer an alternating electromotive force induced in its field-magnet windings and the alternating-current responsive relay 28 is de-energized to permit re-engagement of the contact members 27. When the contact members 26 are also engaged, because of the energization of the operating coil 19 of the relay 20, a circuit is completed extending from the battery 21 through the contact members 26 and 27 to the operating coil 24 of the relay 25, thereby energizing this coil to cause the relay 25 to effect disengagement of the contact members 30 and engagement of the contact members 29.

When the contact members 30 are disengaged, the circuit shunting the field-magnet windings of the motor 3 is interrupted and when the contact members 29 are engaged, the circuit extending from the exciter generator 7 to the slip rings 8 and 9 of the field-magnet windings of the motor 3 is restored to its closed condition. The field-magnet windings of the motor 3 are thus re-energized from the exciter generator 7 and the motor resumes its operation in synchronism with the supply circuit 1.

The various parts of the system embodying my invention are now in the same condition as before the occurrence of the conditions that caused the motor 3 to fall out of synchronism with the supply circuit 1 and either or both of the relays 13 and 14 are in condition to again function in the manner described above in response to a re-occurrence of similar conditions.

The reverse-energy relays 11 and 12, that are interconnected with the relays 13 and 14 are exactly like each other in construction and connections except that the relay 11 is connected to one phase of the circuit 1 while the relay 12 is connected to another phase. For the same reason that the functioning of only the relay 13 was described, the functioning of only the relay 11 will now be described.

In the event that any phase of the supply circuit 1 becomes open-circuited or short-circuited at some external point, the voltage induced in the stator windings of the motor 3 of that phase will cause energy to pass from these windings into that phase of the circuit 1. Similarly when all of the phases are short-circuited, the motor 3 will be driven as a generator by the generator 4 acting as a motor to supply energy to the circuit. When this condition obtains in the phase to which the reverse-energy relay 11 is connected, the currents tranversing the current coil 32 and a potential coil 49 of this relay that are energized from the current transformer 17 and the potential transformer 15, respectively, set up a magnetic flux in a core member 50 in such a direction as to co-operate with the force of a spiral spring 52 to cause a disc 51 to so turn as to effect disengagement of the contact members 47 and engagement of contact members 53.

The contact members 53 are so connected in parallel relation with the contact members 45 of the relay 13 that, when they are engaged, substantially the same operations take place as described previously for the engagement of the contact members 45. The first of these operations is the close-circuiting of the operating coil 19 of the relay 20, which causes this relay to effect disengagement of the contact members 23 and 26, respectively. Subsequent to this operation, the field-magnet windings of the motor 3 are disconnected from the exciter generator 7 and close-circuited to the resistor 46 of the operating coil 31 of the relay 28.

In order that the circuit shunting the field-magnet windings of the motor 3 may be opened and these windings be reconnected to the exciter generator 7, it is first necessary that the operating coil 19 of the relay 20 be re-energized. This means that the relays 11 and 12 must effect engagement of the contact members 47 and 48, respectively, to complete a circuit from the battery 21 to the operating coil 19 of the relay 20. When none of the phases of the supply circuit 1 are supplied with energy from the motor 3 acting as a generator, but rather are all supplying energy to the motor 3, thereby indicating that the short-circuit or open-circuit no longer exists, the relays 11 and 12 will be actuated against the forces of the spiral springs 52 and 54, respectively, to effect engagement of the contact members 47 and 48, respectively. Thereupon the operating coil 19 of the relay 20 is re-energized from the battery 21 and the motor 3 is re-synchronized with the supply circuit 1 in the manner previously described.

The apparatus is now again in its normal operating condition and the various relays and other apparatus embodying my invention are ready to operate as before in response to the same conditions.

It will be understood that the system embodying my invention is not limited to the specific details of construction and connections that have been described in the foregoing specification, as many changes and modifications may be made therein without departing from the spirit and scope of my invention, as set forth in the appended claims.

I claim as my invention:

1. The combination with a supply circuit, a distribution circuit and an electrical translating device connected therebetween and operating in synchronism with the supply circuit, of means responsive to the restoration of energy to the supply circuit after an interruption thereof for effecting re-synchronizing of the translating device with the supply circuit.

2. The combination with a multi-phase supply circuit, a motor driven by energy supplied thereby, field-magnet windings for the motor, a generator driven by the motor and a distribution circuit energized by the generator, of means responsive to a predetermined excessive current traversal of any phase of the supply circuit and a coincident predetermined reduction of voltage in the same phase for short-circuiting the field-magnet windings of the motor.

3. The combination with a multi-phase supply circuit, a motor driven by energy supplied thereby, field-magnet windings for the motor, a generator driven by the motor and a distribution circuit energized by the generator, of relay-controlled means responsive to a predetermined excessive current traversal of any phase of the supply circuit and a coincident predetermined reduction of voltage in the same phase for short-circuiting the field-magnet windings of the motor.

4. The combination with a supply circuit, a motor driven by energy supplied thereby, field-magnet windings for the motor, a generator driven by the motor and a distribution circuit energized by the generator, of a plurality of relays responsive to a simultaneous predetermined reduction of voltage and predetermined increase of current in any phase of the supply circuit for effecting short-circuiting of the field-magnet windings of the motor.

5. The combination with a supply circuit, a motor driven by energy supplied thereby, field-magnet windings for the motor, a generator driven by the motor and a distribution circuit energized by the generator, of a plurality of relays responsive to a reversal of energy traversing the supply circuit for effecting and maintaining short-circuiting of the field-magnet windings of the motor until energy begins to traverse the supply circuit in the normal direction.

6. The combination with a supply circuit, a motor driven by energy supplied thereby, field-magnet windings for the motor, a generator driven by the motor and a distribution circuit energized by the generator, of a plurality of relays responsive to a simultaneous predetermined reduction of voltage and predetermined increase of current in any phase of the supply circuit for effecting short-circuiting of the field-magnet windings of the motor, and a plurality of relays responsive to a reversal of energy traversing the supply circuit for effecting and maintaining the field-magnet windings of the motor short-circuited until energy again begins to traverse the supply circuit in the normal direction.

7. The combination with a supply circuit, a motor normally energized therefrom, a generator driven by the motor and a distribution circuit energized by the generator, of means for causing the generator to operate as a motor from the distribution circuit to drive the motor when the supply of energy from the supply circuit to the motor is interrupted, and a plurality of relays responsive to predetermined conditions in the circuits for controlling said means.

In testimony whereof, I have hereunto subscribed my name this 7th day of December, 1923.

CHARLES A. BUTCHER.